US008001005B2

(12) United States Patent
Pitkow et al.

(10) Patent No.: US 8,001,005 B2
(45) Date of Patent: Aug. 16, 2011

(54) SYSTEMS AND METHODS FOR PROVIDING ADVERTISING IN A FEED OF CONTENT

(75) Inventors: James E. Pitkow, San Francisco, CA (US); Angus G. K. Bankes, London (GB); Kenneth Buckley Smith, San Francisco, CA (US)

(73) Assignee: Moreover Acquisition Corporation, Vienna, VA (US)

( * ) Notice: Subject to any disclaimer, the term of this patent is extended or adjusted under 35 U.S.C. 154(b) by 1298 days.

(21) Appl. No.: 11/043,682

(22) Filed: Jan. 25, 2005

(65) Prior Publication Data
US 2006/0167749 A1    Jul. 27, 2006

(51) Int. Cl.
G06Q 30/00    (2006.01)
G05B 19/418    (2006.01)

(52) U.S. Cl. ........................... 705/14.73; 707/706

(58) Field of Classification Search ............ 705/14; 707/706
See application file for complete search history.

(56) References Cited

U.S. PATENT DOCUMENTS

| | | | |
|---|---|---|---|
| 6,122,647 A | 9/2000 | Horowitz et al. | |
| 6,868,525 B1 | 3/2005 | Szabo | |
| 6,892,186 B1 | 5/2005 | Preist | |
| 7,203,684 B2 * | 4/2007 | Carobus et al. | 1/1 |
| 2004/0078316 A1 | 4/2004 | Clark et al. | |
| 2005/0021609 A1 | 1/2005 | Houghton et al. | |
| 2005/0165615 A1 * | 7/2005 | Minar | 705/1 |
| 2005/0172024 A1 | 8/2005 | Cheifot et al. | |
| 2005/0267973 A1 * | 12/2005 | Carlson et al. | 709/228 |
| 2006/0122929 A1 | 6/2006 | Schoen et al. | |
| 2006/0173985 A1 | 8/2006 | Moore | |
| 2007/0156809 A1 | 7/2007 | Dickinson et al. | |
| 2007/0174340 A1 | 7/2007 | Gross | |
| 2007/0250428 A1 | 10/2007 | Rabenold et al. | |

OTHER PUBLICATIONS http://web.archive.org/web/20040812222649/http://www.thearchitect.co.uk/schemas/rss-2_0.xsd. thearchitect. XML Schema for RSS v2.0 . Jorgen Thelin.Date: Jun. 23, 2003.*
AA Launches Daily world Wire today. Advertising age. p. 2. Oct. 10, 1994.*
The International Search Report and Written Opinion, mailed Sep. 20, 2007, in related International Patent Application No. PCT/US2007/004074 filed Feb. 16, 2007.
International Search Report and Written Opinion, mailed Feb. 15, 2008, in related International Patent Application No. PCT/US2007/062317 field Feb. 16, 2007.
Related U.S. Appl. No. 11/357,813, filed Feb. 16, 2006.
Related U.S. Appl. No. 11/357,293, filed Feb. 16, 2006.
PRN: "Pluck Selects Moreover Technologies . . ." PR Newswire Sep. 21, 2004, Dialog file 613 #0001338786, 3 pages.
Pluck.com :Internet Archive Wayback Machine, www.archive.org: ww.pluck.com; May 2005; 5 pgs.
Rupley, Sebastian: The never-ending search, PC Magazine Jan. 2005 v24n1p26: Dialog file 16#12641698, 2 pgs.
Business Wire: "New Perch" Feature from Pluck Simplifies Shopping on eBay and Amazon.com, Nov. 16, 2004 Proquest #737082131, 3 pgs.
UU; Stepno, Bob "News on demand: tired of browsing . . ."PC World, Jul. 2004, v22n7pg149; Dialog file 148#0017252069.

* cited by examiner

Primary Examiner — John Weiss
Assistant Examiner — Victoria Vanderhorst
(74) Attorney, Agent, or Firm — Holland & Hart LLP

(57) ABSTRACT

A system and method is described for controlling the provision of advertising presented to an end user in a feed of news content that is delivered from a publisher to an end user, wherein the system comprises: one or more advertisements which each possess a unique identifier that has been attributed by the publisher;

reader software deployed in the system to analyse the delivered feed of news content and the one or more advertisements, wherein the reader software is adapted to ensure that any duplication of the one or more advertisements is identified by reference to the unique identifier of each advertisement; and wherein the reader software controls the presentation of news content and a predefined number of non-duplicate advertisements to the end user.

16 Claims, No Drawings

SYSTEMS AND METHODS FOR PROVIDING ADVERTISING IN A FEED OF CONTENT

The present invention relates to systems and methods for providing advertising in a feed of content to a user and, particularly but not exclusively, the provision of contextual advertising to users in a stream of content via a communication network.

BACKGROUND OF THE INVENTION

The Internet is a vast computer network consisting of many smaller networks that span the entire World. The Internet and the number of users has grown rapidly in recent years. Indeed millions of people per day connect to the Internet using both permanent and dial up connections. The computers, or networks of computers, connected to the Internet are referred to as "hosts", allow public access to files, documents and data covering a vast array of content such as information relating to current events, the weather, financial matters, business matters, entertainment, lifestyle issues, industrial matters, science, sports, society, international affairs, technology, etc The content on the Internet is made available to the public through "servers". A server is a computer system running on an Internet host that makes its contents available to the public. A user may use their computer (typically an home personal computer or Internet connected workstation, known as the "client") to request that information contained on the server be distributed via the Internet so that is may be displayed by the user's computer. The server will distribute the requested contents to the client.

The World-Wide Web (Web) is a system for accessing information on the Internet that allows a user to navigate the Internet resources intuitively, without knowledge of specific addresses of information content or other technical information. The Web is made up of numerous Web "pages" that can be displayed by a client's computer to the user, typically by the client computer using a Web browser. The Internet servers provide the Web pages from their location on the Web, known as their Web sites.

Companies which deal in the business of reporting news and the like, such as newspapers and television channels and news agencies generally, have realised the value of supplying information via the Internet and have set up their own Web sites to facilitate this dissemination.

Due to the success of this dissemination there are now a multiplicity of Web sites providing online news and information that may be of interest to a user.

With the continued expansion of online news Web sites, it has become increasingly difficult for users to sift through the vast array of information that is available in order to locate information which is of particular interest to them.

Out of this disarray has risen a service which scours the Web to obtain targeted information that is of interest to a user's specific requirements. This targeted information is aggregated and provided to the user in a feed. Such is the success of this model of information delivery, it is becoming the most popular delivery model of information to users of the Web. The principal benefit of this aggregated model of delivery being that it saves the user a great deal of time compared to manually acquiring content from individual Web sites.

Whilst this aggregation can be provided via payment methods such as subscriptions or the like, some users are not in a position where they can easily afford the expense, or may simply prefer not to incur a great deal of expenditure in gathering information which is of interest to them. In order to make such information aggregation available without financial incumbency, the cost of aggregating the information can be supported by providing the aggregated information together with advertisements. The revenue generated from the advertiser or advertising network in return for the inclusion of their advertisement will subsidise the free, or inexpensive, provision of the aggregated information.

To ensure that there are sufficient users of the free or inexpensive aggregated information, it is preferable that the amount of advertisements are controlled to ensure that the user does not feel as though they are being spammed. "Spammed" is used herein to mean an unacceptable amount of unsolicited advertisements or the like.

To guard against a user feeling as though they are being spammed, a user deploys software (reader software) which not only displays the aggregated information in an acceptable form to the user, but also prevents the user being faced with the same information, be it news content or advertisement, every time aggregated information is processed by the reader software.

Existing reader software has hitherto identified the uniqueness of the content of a feed by analysing the hyperlink of each component of the feed, be it news content or advertisements. The drawback of this however is that the hyperlink of the news contents and advertisements typically change on a differing basis.

The term "hyperlink" as used herein is to be understood to relate to any suitable means which allows an end user to conveniently access a document which possesses the full details of the component contained in the feed.

With news content, the hyperlink to each story or feature etc. will generally remain static. The hyperlink may change during the course of time but this will typically be in response to an update of the story or feature and, as such, the end user may wish to read this update. Therefore, hyperlinks provide a useful means of identifying whether the news content has been seen by the reader software previously, thus allowing the software to prevent repeated displays of the same news content to the end user during periods of a low flux of news content.

However, the use of hyperlinks as an identification means is not suitable where advertisements are concerned. Typically providers of advertisements will frequently change the hyperlink to subvert the identification strategy employed by the reader software and this can have several damaging implications.

Firstly, during periods of low flux of news content, the reader software analyses the hyperlinks of the components of the delivered feed and concludes that all of the news content been displayed to the end user previously. However the software would also identify that there was some new content in the form of the advertisements. Hence, only the advertisements would be displayed to the end user as being new. If this low flux of news content continued, the display to the end user could eventually consist of nothing but advertisements. Clearly this high level of advertisements, or spamming, would not be satisfactory to the end user.

Secondly, the constant changing of the advertisement's hyperlink could result in the same advertisement being repeatedly displayed to the end user. Indeed, in an extreme case, during a situation of low flux of news content, as described above, it is possible that the display to the user could be a series of identical advertisements only being distinguishable from each other by virtue of having different hyperlinks. Such a situation would clearly be deeply unsatisfactory to the end user.

Thirdly, this situation can impair the contextual accuracy of the advertisements.

Fourthly, advertising networks are often desirous of changing the hyperlink in order to steer different people toward different advertisements. Advertising networks operate independently of the feeds discussed herein and, thus, are not within the scope of the present invention. These advertising networks investigate the use of advertisements by end users and employ sophisticated techniques to determine whether an advertisement is accessed, how deeply it is accessed and which advertisements are accessed more than others. The changing of the hyperlink affords the advertising network a greater degree of sophistication when deploying their techniques.

Fifthly, advertising networks will also frequently change the hyperlink to avoid fraudulent clicks, often referred to as click fraud. Click fraud is when a business receives invalid clicks on a paid advertisement listing by a competitor or individual having no intention of using the service or purchasing the goods under the advertisement. A click is invalid when the person making the click does it for the sole purpose of costing the advertiser money or financial harm. Click fraud may occur from competing advertisers or simply individuals just wanting to harm or frustrate the advertiser.

For the reasons stated above, and for other reasons stated below which will become apparent to those skilled in the art upon reading and understanding the present specification, there is a need in the art for systems and methods which improve contextual advertising within streams of content provided to end users.

SUMMARY OF THE INVENTION

The present invention allows advertising to be included in feeds of news content, wherein the advertisements are controlled in a manner which renders them satisfactory from an end user's perspective and also from the perspective of an advertiser and a publisher.

According to one feature of the present invention there is provided a system for controlling the provision of advertising presented to an end user in a feed of news content that is delivered from a publisher to an end user, wherein the system comprises: one or more advertisements which each possess a unique identifier that has been attributed by the publisher;

reader software deployed in the system to analyse the delivered feed of news content and the one or more advertisements, wherein the reader software is adapted to ensure that any duplication of the one or more advertisements is identified by reference to the unique identifier of each advertisement; and wherein the reader software controls the presentation of news content and a predefined number of non-duplicate advertisements to the end user.

According to a further feature of the present invention there is provided a method of controlling the provision of advertising presented to an end user in a feed of news content that is delivered from a publisher to an end user, the method comprising the attribution by the publisher of a unique identifier to each advertisement, reader software analysing the delivered feed of news content and one or more advertisements and using the unique identifier of the or each advertisement to ensure that any duplication of the one or more advertisements is identified, the reader software then allowing the end user to be presented with the news content and a predefined number of non-duplicate advertisements.

Unlike existing systems and methods which employ reader software to identify the uniqueness of feed content by analysing the hyperlink of each item, be it news content or advertisements, the present invention determines the uniqueness of an advertisement based on the analysis of a unique identifier attributed thereto. As discussed above, the hyperlink of the news contents and advertisements typically change on a differing basis. With news content, the hyperlink to each story or feature etc. will generally remain static. The hyperlink may change during the course of time but this will typically be in response to an update of the story or feature and, as such, the end user may wish to read this update. By ensuring that the reader software only identifies each advertisement with reference to the unique identifier attributed to it, the permanent nature of the unique identifier ensures that the reader software may recognise whether the advertisement has been displayed to the end user previously or not, regardless of whether its hyperlink has changed.

The publisher may attribute any suitable unique identifier to an advertisement, the identifier being any suitable, string, coding, tag or other means. Thereafter, any other advertisement having an identical or substantially identical content, will be attributed the same unique identifier. The identifier may be associated with an advertisement substantially permanently. Alternatively, the identifier may only be effective for a period of time to be determined by the publisher. Regardless, the identifier should be associated with the advertisement for a sufficient period of time consistent with the typical life span of an advertisement in order to guard against an end user being presented with an identical or substantially identical advertisement.

One suitable form of unique identifier is a GUID. A GUID (Globally Unique IDentifier) is a string adapted to uniquely identify the article to which it is attributed. The GUID may, amongst other characteristics, be a 128-bit generated number, and/or contain a date string, and/or a straight number calculated in whole or in part from the date or date string, and/or have a "isPermaLink" facet with a value of "true" or "false" associated therewith.

The system and method of the present invention may be used to provide the end user with contextual advertising. In order to deliver a contextual advertisement, the news content is analysed and a suitably contextually related advertisement or advertisements are correlated and associated with the news content in the feed. The publisher may be responsible for ensuring the contextual nature of the advertisement. Alternatively, an advertiser or advertising network or publisher or other third party may provide the advertisements and be responsible for ensuring the contextual nature thereof.

Reader software may be deployed to be operative on the client computer. Alternatively, the reader software may be deployed to be operative on the host computer or any system therein, e.g. proxy server, cache, etc.

It is to be understood that a feed of news content should be interpreted to mean a discrete quantity of information. Within the context of the present invention, the feed of news content may contain at least one piece of news content and/or at least one advertisement. Alternatively the feed of news content may contain at least one piece of news content and at least one advertisement. As a further alternative, the feed of news content may contain at least one piece of news content or at least one advertisement.

The feed may by a stream of RSS content. RSS is used herein to relate to Rich Site Summary or Really Simple Syndication. Other content streams which the present invention may also be applicable including, but not limited to, streams of XML (Extensible Markup Language) content, XSL (Extensible Style Language) content, SGML (Standard Generalized Markup Language) content, video content, audio content, etc.

The reader software may be configured to recognise the identity of news content with reference to the hyperlink of each component of the news content, and where duplications exist, these are not presented to the user. Simultaneously, or substantially simultaneously, with this recognition, the reader software may also be configured to identify advertisement(s) with reference to the unique identifier attributed thereto.

Furthermore, the reader software may be configured to simultaneously, or substantially simultaneously, recognise the identity of all components in the feed of news content with reference to both the hyperlink and unique identifier. In this arrangement, only the advertisements will possess a unique identifier and, where present, this will be used as the default means by which the reader software will determine whether the advertisement is a duplicate of what has been displayed to the end user previously.

In a further arrangement, the reader software may be adapted to use the unique identifier as a guide means for the content presented to the end user. In one envisaged embodiment, the reader software could possess a template through which it presents the feed content to the end user. For example, the template may be disposed with 10 positions that can each be filled with feed content. This template may be arranged such that positions 1 and 3-10 are available for news content, and position 2 may only be filled with content possessing a unique identifier. Therefore, in this arrangement, after the software has identified whether the content of the feed represents duplicate matter insofar as it has been presented to the end user previously, news content would be displayed in template positions 1, 3-10 and an advertisement would be displayed in position 2. Only one advertisement could be displayed by this template and only in position 2 as the advertisement would be the only component of the feed to possess a unique identifier.

It is to be understood that the use of the term "template" is meant is a non-limiting sense and is intended to cover the general presentation of the feed content to the end user.

The reader software may be RSS reader software. RSS 2.0 software may be utilised in the reader software of the present invention.

The feed of news content may be delivered automatically from a publisher to an end user, via the reader software. Alternatively the reader software may routinely call for a feed of news content from the publisher. The automatic delivery or the routine call may have any varying time span between each delivery or call.

The end user may impart a set of parameters they wish to be imposed on the feed of news content into the reader software prior to receiving a feed of news content in order to suitably characterise the nature of the information contained within the feed. For instance, if the end user is particularly interested in current affairs information, this could be the imparted parameters such that only news content featuring information on current affairs will be presented to the end user.

The end user may impart the set of parameters they wish to be imposed on the feed of news content directly with the publisher prior to receiving a feed of news content.

It is to be understood that news content should be interpreted to mean any form of information whether news related or not such as, but not limited to, information relating to: current events, weather, financial matters, stock prices, business matters, entertainment, lifestyle issues, product information, travel details, resumes, events, auctions, industrial matters, the internet, science, sports, society, international affairs, technology, etc. It should also be understood that the According to a further feature of the present invention there is provided a system for controlling the provision of advertising presented to an end user in a feed of news content that is automatically delivered from a publisher to an end user, wherein the system comprises: one or more advertisements which each possess a unique identifier that has been attributed by the publisher;

reader software deployed in the system to analyse the automatically delivered feed of news content and the one or more advertisements, wherein the reader software is adapted to ensure that any duplication of the one or more advertisements is identified by reference to the unique identifier of each advertisement; and wherein the reader software controls the presentation of news content and a predefined number of non-duplicate advertisements to the end user.

According to a further feature of the present invention there is provided a method of controlling the provision of advertising presented to an end user in a feed of news content that is automatically delivered from a publisher to an end user, the method comprising the attribution by the publisher of a unique identifier to each advertisement, reader software analysing the delivered feed of news content and one or more advertisements and using the unique identifier of the or each advertisement to ensure that any duplication of the one or more advertisements is identified, the reader software then allowing the end user to be presented with the news content and a predefined number of non-duplicate advertisements.

According to a further feature of the present invention there is provided a system for controlling the provision of contextual advertising presented to an end user in a feed of news content that is automatically delivered from a publisher to an end user, wherein the system comprises:

one or more advertisements which each possess a unique identifier that has been attributed by the publisher;

reader software deployed in the system to analyse the automatically delivered feed of news content and the one or more advertisements, wherein the reader software is adapted to ensure that any duplication of the one or more advertisements is identified by reference to the unique identifier of each advertisement; and wherein the reader software controls the presentation of news content and a predefined number of non-duplicate contextual advertisements to the end user.

According to a further feature of the present invention there is provided a method of controlling the provision of contextual advertising presented to an end user in a feed of news content that is automatically delivered from a publisher to an end user, the method comprising the attribution by the publisher of a unique identifier to each advertisement, reader software analysing the delivered feed of news content and one or more advertisements and using the unique identifier of the or each advertisement to ensure that any duplication of the one or more advertisements is identified, the reader software then allowing the end user to be presented with the news content and a predefined number of non-duplicate contextual advertisements.

According to a further feature of the present invention there is provided a system for controlling the provision of contextual advertising presented to an end user in a feed of news content that is automatically delivered from a publisher to an end user, wherein the system comprises:

one or more advertisements which each possess a unique identifier that has been attributed by the publisher;

reader software deployed in the system to analyse the automatically delivered feed of news content and the one or more advertisements, wherein the reader software is adapted to ensure that any duplication of the one or more advertisements is identified and removed by reference to the unique identifier of each advertisement; and wherein the reader software controls the presentation of news content and a predefined number of non-duplicate contextual advertisements to the end user.

According to a further feature of the present invention there is provided a method of controlling the provision of contextual advertising presented to an end user in a feed of news content that is automatically delivered from a publisher to an end user, the method comprising the attribution by the publisher of a unique identifier to each advertisement, reader software analysing the delivered feed of news content and one or more advertisements and using the unique identifier of the or each advertisement to ensure that any duplication of the one or more advertisements is identified and removed, the reader software then allowing the end user to be presented with the news content and a predefined number of non-duplicate contextual advertisements.

With the above described features of the present invention it is envisaged that the publisher will provide the attribution of the unique identifier to the or each advertisement. However, as described below, the present invention also envisages an alternative attribution of the unique identifier.

According to a further feature of the present invention there is provided a system for controlling the provision of advertising presented to an end user in a feed of news content that is delivered from a publisher to an end user, wherein the system comprises: one or more advertisements which each possess a unique identifier that has been attributed by a content supplier;

reader software deployed in the system to analyse the delivered feed of news content and the one or more advertisements, wherein the reader software is adapted to ensure that any duplication of the one or more advertisements is identified by reference to the unique identifier of each advertisement; and wherein the reader software controls the presentation of news content and a predefined number of non-duplicate advertisements to the end user.

According to a further feature of the present invention there is provided a method of controlling the provision of advertising presented to an end user in a feed of news content that is delivered from a publisher to an end user, the method comprising the attribution by a content supplier of a unique identifier to each advertisement, reader software analysing the delivered feed of news content and one or more advertisements and using the unique identifier of the or each advertisement to ensure that any duplication of the one or more advertisements is identified, the reader software then allowing the end user to be presented with the news content and a predefined number of non-duplicate advertisements.

The term "content provider" is used herein to refer to the providers of the news content itself. Whilst the publisher searches, collects and collates the news content, it is the content provider whom publishes the content in the first instance. The present invention further envisages that the content provider may additionally provide the or each advertisement, the advertisement(s) being subsequently presented to the end user via the publisher and reader software. In this instance, the content provider may also be responsible for ensuring the contextual nature of the advertisements.

According to a further feature of the present invention there is provided a system for controlling the provision of advertising presented to an end user in a feed of news content that is delivered from a publisher to an end user, the system comprising:

analysing means that are configured to allow a publisher and/or an advertiser and/or a third party to analyse the feed of news content;

the analysing means also being configured to recall the news content supplied to reader software;

wherein the analysing means is further configured to produce a feed of news content which has not been previously supplied to the reader software; and wherein the publisher and/or advertiser and/or third party introduces at least one advertisement to said feed of content according to a predefined routine.

According to a further feature of the present invention there is provided a method for controlling the provision of advertising presented to an end user in a feed of news content that is delivered from a publisher to an end user, the method comprising:

the use of analysing means to allow a publisher and/or an advertiser and/or a third party to analyse a feed of news content;

use of the analysing means to recall the news content supplied to reader software previously;

further use of the analysing means to produce a feed of news content which has not been previously supplied to the reader software; and the introduction of at least one advertisement to said feed of content according to a predefined routine by the publisher and/or an advertiser and/or a third party.

Preferably the analysing means interrogates the feed of news content to uniquely identify the components thereof. The analysing means may interrogate the feed of news content with reference to a unique identifier. One suitable form of unique identifier is a GUID.

In order that the present invention can be more readily understood a specific embodiment thereof will be described in detail by way of example.

DETAILED DESCRIPTION OF THE INVENTION

The prior art most broadly includes contextual advertising, where the news content is analysed and a relevant advertisement is displayed based upon the nature of the content. The contextual advertising business solutions are geared at matching advertising to static pages of news content. These contextual advertising business solutions also work with hosted RSS reader services, i.e. a service that displays a page each time the user wants to view a feed. Such a hosted RSS service is equivalent to a static page of content. Providers of hosted RSS services do not face the challenges of presenting advertising to users via a stream of content.

In order to understand the solution of the present invention the current state of RSS reader software and advertising will be described. End users can read or subscribe to a RSS feed by either (a) adding the feed to an online hosted service that performs the services of RSS reader software, or (b) access the RSS feed via a piece of software called RSS reader software.

In case (a), once the feed has been added to the list of feeds being read by the end user, the online service will retrieve the RSS news content for the publisher site and this will be displayed to that end user. In this case, if the service wants to control the number of advertisement places displayed to the end user, they can easily insert a unique, contextually matched advertisement into the displayed content. In other words, this is broadly equivalent to displaying an HTML page with contextual advertisements. In this scenario, the publisher can easily control the number of advertisements displayed to each end user as well as ensure that each end user gets a uniquely generated hyperlink for each advertisement, minimising the potential of fraud. However, this does not enable the publisher to control the insertion of advertising into a stream of content.

In case (b), and according to the present invention, once the feed has been added to the list of feeds being read by the end user, the reader software will automatically check for updates to the RSS feed on a periodic basis, typically in the range of once every 15 minutes to once every 3 hours. When the reader software checks for an update, it requests the latest x number of articles from the publisher, regardless of whether the reader software has already downloaded the content. In the event that there is content (headline links in this case) that has already been presented to the user, the reader software does not redisplay the duplicated content. The test that the reader software typically does is to check the hyperlink to the content returned in the RSS feed. If the hyperlinks for two components in the RSS feed are the same, the latest retrieved item is considered a duplicate and not presented to the user The easiest method of inserting advertisements into RSS feed is to do just that. Each time a call is made to the publisher for news content, the publisher inserts an advertisement as a new RSS component into the feed. Whilst this may appear to solve the problem, it creates an excessive amount of advertising displayed to the end user. The reason for this excessive amount of advertising is set out below:

1) User A calls http://news.bbc.co.uk/go/click/rss/0.91/public/-/2/hi/americas/default.stm to get BBC's Americas News Feed at 3:00 GMT 2) BBC returns the following RSS feed (with several items removed)

```
<?xml version="1.0" encoding="ISO-8859-1" ?>
<rss version="0.91"><channel>
    <title>BBC News | Americas | World Edition</title>
    <link>http://news.bbc.co.uk/go/click/rss/0.91/public/-/2/hi/americas/default.stm</link>
    <description>Updated every minute of every day - FOR PERSONAL USE ONLY</description>
    <language>en-gb</language>
    <lastBuildDate>Wed, 22 Sep 04 20:31:25 GMT</lastBuildDate>
    <copyright>Copyright: (C) British Broadcasting Corporation, http://news.bbc.co.uk/1/hi/help/3281849.stm</copyright>
    <docs>http://www.bbc.co.uk/syndication/</docs>
        <image>
            <title>BBC News</title>
    <url>http://news.bbc.co.uk/nol/shared/img/bbc_news_120x60.gif</url>
            <link>http://news.bbc.co.uk</link>
        </image>
        <item>
    <title>ADV: BUY THIS NOW</title>
    <description>
WE HAVE WHAT YOU NEED< BUYT IT NOW</description>
    <link>http://www.advertising_network.com/4000.html</link>
</item>
            <item>
    <title>Cat Stevens sparks US alert</title>
    <description>Yusuf Islam, the singer formerly known as Cat Stevens, is sent back to London after being refused entry to the US.</description>
    <link>http://news.bbc.co.uk/go/click/rss/0.91/public/-/2/hi/americas/3678694.stm</link>
</item>
            <item>
    <title>Nato agrees to expand Iraq role</title>
    <description>The Nato alliance agrees to play a major role in training Iraqi security forces, a spokesman says.</description>
    <link>http://news.bbc.co.uk/go/click/rss/0.91/public/-/2/hi/europe/3680504.stm</link>
</item>
</channel>
</rss>
```

3) User A calls http://news.bbc.co.uk/go/click/rss/0.91/public/-/2/hi/americas/default.stm at 3:15 GMT
4) Despite it not publishing any new articles, the BBC returns the following RSS feed (several items removed):

```
<?xml version="1.0" encoding="ISO-8859-1" ?>
<rss version="0.91"><channel>
    <title>BBC News | Americas | World Edition</title>
    <link>http://news.bbc.co.uk/go/click/rss/0.91/public/-
/2/hi/americas/default.stm</link>
    <description>Updated every minute of every day - FOR PERSONAL USE
ONLY</description>
    <language>en-gb</language>
    <lastBuildDate>Wed, 22 Sep 04 20:31:25 GMT</lastBuildDate>
    <copyright>Copyright: (C) British Broadcasting Corporation,
http://news.bbc.co.uk/1/hi/help/3281849.stm</copyright>
    <docs>http://www.bbc.co.uk/syndication/</docs>
        <image>
            <title>BBC News</title>
    <url>http://news.bbc.co.uk/nol/shared/img/bbc_news_120x60.gif</url>
            <link>http://news.bbc.co.uk</link>
        </image>
        <item>
    <title>ADV: BUY NIKE NOW</title>
    <description>
BUY NIKE NOW</description
    <link>http://www.advertising_network.com/4001.html</link>
</item>
        <item>
    <title>Cat Stevens sparks US alert</title>
    <description>Yusuf Islam, the singer formerly known as Cat
Stevens, is sent back to London after being refused entry to the
US.</description>
    <link>http://news.bbc.co.uk/go/click/rss/0.91/public/-
/2/hi/americas/3678694.stm</link>
</item>
        <item>
    <title>Nato agrees to expand Iraq role</title>
    <description>The Nato alliance agrees to play a major role in
training Iraqi security forces, a spokesman says.</description>
    <link>http://news.bbc.co.uk/go/click/rss/0.91/public/-
/2/hi/europe/3680504.stm</link>
</item>
</channel>
</rss>
```

Since the deployed reader software determines if items are duplicates by checking to see if the hyperlinks are the same, it will conclude the two advertisements are different and display them both. Given the temporal nature of news, reader software tends to sort articles by time and, as such, the top two articles presented to the end user will now be advertisements. The "stacking" of advertisements will continue until the BBC issues a new news article.

This method of delivering advertisements has several drawbacks. Firstly, it does not allow the publisher to control how many advertisements are displayed to the end user, the number of advertisements displayed is a function of the number of non-advertisements published and the frequency of call for the RSS feed by the end user.

Secondly, it creates excessive advertisements by the publisher during periods of low flux of news, which is an undesirable experience for the end user.

An alternative solution to the problem is for the publisher to use the same hyperlink for all advertisements and change the hyperlink as often as it desires. In this case, all reader software for every end user would get the same advertisement for a fixed period of time. This is undesirable as it does not take advantage of the ability to deliver different advertisements to different people.

Furthermore, this alternative solution makes it difficult for advertising networks to differentiate between valid responses/clicks on advertisements and fraudulent responses/clicks. Advertising networks are designed to deliver one advertisement per page view and employ sophisticated techniques to look for advertisements that receive more than a few clicks. The former is the most impairing flaw, as it minimizes the ability of the publisher and advertiser to deliver their complete inventory of advertisements.

The present invention avoids the impairments of the above two methods by attributing a unique identifier to the or each advertisement in the feed. The unique identifier may be changed by the publisher as desired in order to achieve advertising diversity and saturation rates.

An example is explained below in pseudo RSS 2.0 format:
1) User A calls http://news.bbc.co.uk/go/click/rss/0.91/public/-/2/hi/americas/default.stm to get BBC's Americas News Feed at 3:00 GMT 2) BBC returns the following RSS feed (with several items removed)

```
<?xml version="1.0" encoding="ISO-8859-1" ?>
<rss version="2.0"><channel>
    <title>BBC News | Americas | World Edition</title>
    <link>http://news.bbc.co.uk/go/click/rss/0.91/public/-
/2/hi/americas/default.stm</link>
    <description>Updated every minute of every day - FOR PERSONAL USE
ONLY</description>
    <language>en-gb</language>
    <lastBuildDate>Wed, 22 Sep 04 20:31:25 GMT</lastBuildDate>
    <copyright>Copyright: (C) British Broadcasting Corporation,
http://news.bbc.co.uk/1/hi/help/3281849.stm</copyright>
    <docs>http://www.bbc.co.uk/syndication/</docs>
        <image>
            <title>BBC News</title>
    <url>http://news.bbc.co.uk/nol/shared/img/bbc_news_120x60.gif</url
>
            <link>http://news.bbc.co.uk</link>
        </image>
        <item>
    <title>ADV: BUY THIS NOW</title>
    <description>
WE HAVE WHAT YOU NEED< BUYT IT NOW</description>
    <guid>adv:2004-09-21-03:00:00</guid>
        <link>http://www.advertising_network.com/4000.html</link>
</item>
        <item>
    <title>Cat Stevens sparks US alert</title>
    <description>Yusuf Islam, the singer formerly known as Cat
Stevens, is sent back to London after being refused entry to the
US.</description>
        <link>http://news.bbc.co.uk/go/click/rss/0.91/public/-
/2/hi/americas/3678694.stm</link>
</item>
        <item>
    <title>Nato agrees to expand Iraq role</title>
    <description>The Nato alliance agrees to play a major role in
training Iraqi security forces, a spokesman says.</description>
        <link>http://news.bbc.co.uk/go/click/rss/0.91/public/-
/2/hi/europe/3680504.stm</link>
</item>
</channel>
</rss>
```

40

3) User A calls http://news.bbc.co.uk/go/click/rss/0.91/public/-/2/hi/americas/default.stm at 3:15 GMT 4) Despite it not publishing any new articles, the BBC returns the following RSS feed (several items removed):

```
<?xml version="1.0" encoding="ISO-8859-1" ?>
<rss version="0.91"><channel>
    <title>BBC News | Americas | World Edition</title>
    <link>http://news.bbc.co.uk/go/click/rss/0.91/public/-
/2/hi/americas/default.stm</link>
    <description>Updated every minute of every day - FOR PERSONAL USE
ONLY</description>
    <language>en-gb</language>
    <lastBuildDate>Wed, 22 Sep 04 20:31:25 GMT</lastBuildDate>
    <copyright>Copyright: (C) British Broadcasting Corporation,
http://news.bbc.co.uk/1/hi/help/3281849.stm</copyright>
    <docs>http://www.bbc.co.uk/syndication/</docs>
        <image>
            <title>BBC News</title>
    <url>http://news.bbc.co.uk/nol/shared/img/bbc_news_120x60.gif</url
>
            <link>http://news.bbc.co.uk</link>
        </image>
        <item>
    <title>ADV: BUY NIKE NOW</title>
    <description>
```

-continued

```
BUY NIKE NOW</description>
    <guid>adv:2004-09-21-03:00:00</guid>
        <link>http://www.advertising_network.com/4001.html</link>
</item>
            <item>
        <title>Cat Stevens sparks US alert</title>
        <description>Yusuf Islam, the singer formerly known as Cat
Stevens, is sent back to London after being refused entry to the
US.</description>
        <link>http://news.bbc.co.uk/go/click/rss/0.91/public/-
/2/hi/americas/3678694.stm</link>
</item>
            <item>
        <title>Nato agrees to expand Iraq role</title>
        <description>The Nato alliance agrees to play a major role in
training Iraqi security forces, a spokesman says.</description>
        <link>http://news.bbc.co.uk/go/click/rss/0.91/public/-
/2/hi/europe/3680504.stm</link>
</item>
</channel>
</rss>
```

In this case, since the reader software has used GUIDs as the unique identifier, and thus the primary method of determining the uniqueness of each component of the feed, the end user will only see the first advertisement. In this example, the GUID contains a date string, however, the GUID may, amongst other characteristics be a 128-bit generated number, and/or contain a date string, and/or a straight number calculated in whole or in part from the date or date string, and/or have a "isPermaLink" facet with a value of "true" or "false" associated therewith.

The publisher can control the saturation of advertisements by changing the GUID for the advertisement based upon various parameters. For instance, one parameter may be that the advertisement is changed based on the number of articles delivered, i.e. a new advertisements is delivered every x number of stories. Alternatively, another parameter may be that the advertisement is changed based on how much time has elapsed, i.e. a new advertisement is delivered every x hours. There could well be a combination of the above parameters or some other method.

The present invention provides the publisher with optimal control over the placement of advertisements in their feed and the display of those advertisements to the end user.

It is also envisaged that the publisher may also attribute unique identifier to the or each component of the news content in a feed. This could be advantageous in situations where the content provider operates a policy of rapidly changing the hyperlink for the news content located by the publisher.

That RSS forces the readers to download the entire feed regardless of whether new content is available is a limitation of RSS. Nevertheless, the present invention envisages supply of advertisements in an update-only RSS feed. In this embodiment advertisements are inserted into the update-only feed (with or without a unique identifier) based upon the number of articles (i.e., insert an advertisement every 10 articles, so take the article ID and if it divides by 10 without a remainder, insert an advertisement).

The present invention has been described with reference to several embodiments solely for the purposes of illustration. Persons skilled in the art will recognise from this description that the present invention is not limited to the embodiments described. Additionally, further embodiments of the invention may be devised without departing from the basic scope or spirit thereof.

The invention claimed is:

1. A non-transitory computer readable medium encoded with computer readable instructions for controlling the provision of advertising presented to an end user in a feed of news content that is delivered from a publisher to the end user, wherein each advertisement has an associated hyperlink, the computer readable instructions comprising:
   code for receiving a unique identifier from the publisher for each advertisement;
   code for attributing the unique identifier to each advertisement;
   code for analyzing the delivered feed of news content and one or more advertisements and using the unique identifier of each advertisement to ensure that any duplication of the one or more advertisements is identified; and
   code for presenting the end user with the news content and a predefined number of non-duplicate advertisements.

2. The computer readable medium of claim 1, wherein the identifier is associated with an advertisement substantially permanently.

3. The computer readable medium of claim 1, wherein the identifier is effective for a period of time determined by the publisher.

4. The computer readable medium of claim 1, wherein the unique identifier is a globally unique identifier.

5. The computer readable medium of claim 1, wherein the code for analyzing the delivered feed of news content and one or more advertisements is performed on the end user's computer.

6. The computer readable medium of claim 1, wherein the code for analyzing the delivered feed of news content and one or more advertisements is performed on a host computer.

7. The computer readable medium of claim 1, wherein the feed is a stream of really simple syndication content.

8. The computer readable medium of claim 1, including code for recognizing the identity of news content with reference to a hyperlink associated with each component of the news content, and simultaneously, or substantially simultaneously, identifying one or more advertisements with reference to the unique identifier attributed thereto.

9. The computer readable medium of claim 1, including code for simultaneously, or substantially simultaneously, recognizing the identity of all components in the feed of news content with reference to both a hyperlink and unique identifier.

10. The computer readable medium of claim 1, including code for using the unique identifier as a guide means to limit the number and position of advertisements presented to the end user in a template.

11. The computer readable medium of claim 1, wherein the feed of news content is delivered automatically from a publisher to an end user.

12. The computer readable medium of claim 1, including code for allowing the end user to impart a set of parameters to be imposed on the feed of news content prior to receiving a feed of news content in order to suitably characterize the nature of the information contained within the feed.

13. The computer readable medium of claim 1, including code for allowing the end user to impart a set of parameters to be imposed on the feed of news content directly with the publisher prior to receiving a feed of news content.

14. A computer implemented method of controlling the provision of advertising presented to an end user in a feed of news content that is delivered from a host computer of a publisher to an end user having an associated end user computer, wherein each advertisement has an associated hyperlink, the computer implemented method comprising:

attributing a computer readable unique identifier to each advertisement, wherein the unique identifier is attributed by the publisher;

analyzing with either the end user computer or the host computer, the delivered feed of news content and one or more advertisements and reading the unique identifier of each advertisement with a computer to ensure that any duplication of the one or more advertisements is identified; and presenting the end user with the news content and a predefined number of non-duplicate advertisements.

15. The method of claim 14, wherein analyzing the delivered feed of news content and one or more advertisements is performed on the end user's computer.

16. The method of claim 14, wherein analyzing the delivered feed of news content and one or more advertisements is performed on a host computer.

* * * * *